Nov. 3, 1931.  I. H. BEAL  1,829,952
EARTH CONDITIONING IMPLEMENT
Filed Aug. 9, 1930
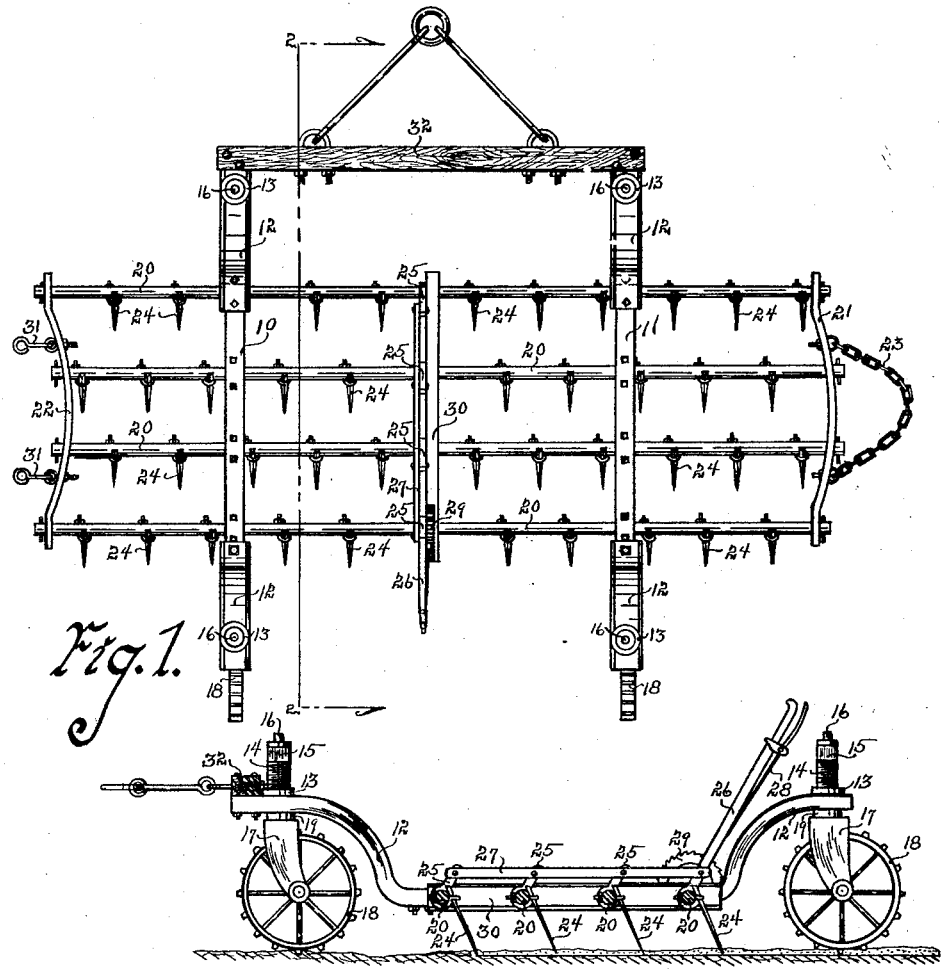
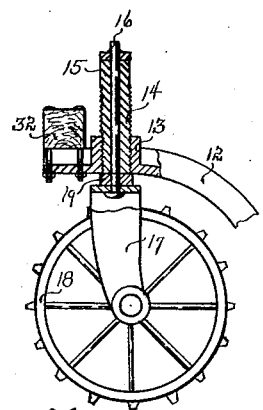
Inventor
Ira H. Beal
By M. Talbert Dick
Attorney Patented Nov. 3, 1931

1,829,952

UNITED STATES PATENT OFFICE

IRA H. BEAL, OF GOWRIE, IOWA

EARTH CONDITIONING IMPLEMENT

Application filed August 9, 1930. Serial No. 474,162.

The principal object of this invention is to provide a new improved field or road conditioning device that successfully crushes, pulverizes and distributes the dirt, loam or the like over which it is drawn.

A further object of this invention is to provide a harrowing device that may be easily moved sidewise as well as forwardly.

A still further object of my invention is to provide an earth conditioning implement that requires a minimum amount of energy to move it over the ground and one that is easily turnable at corners.

A still further object of this invention is to provide a harrowing device that may be easily transported from place to place when not in use.

A still further object of this invention is to provide a harrow device that may be easily adjusted for furrowing the ground over which it passes at various depths without changing the angle of attack of the parallel teeth.

A still further object of my invention is to provide a harrowing device that is free from clogging when operated over a field possessing an excessive amount of weeds, straw, cornstalks or the like.

A still further object of this invention is to provide an earth conditioning implement that is economical in manufacture and durable in use.

These and other objects will be apparent to those skilled in the art.

My invention consists in the construction, arrangement and combination of the various parts of the device, whereby the objects contemplated are attained as hereinafter more fully set forth, pointed out in my claims and illustrated in the accompanying drawings, in which:

Fig. 1 is a top plan view of one section of my device ready for use.

Fig. 2 is a cross sectional view taken on line 2—2 of Fig. 1.

Fig. 3 is a side sectional view of one of the supporting caster wheels and assembly and more fully illustrates their interior constructions.

One of our oldest farm implements for the conditioning of ground for agricultural purposes is the harrow. The harrow, however, as used today is not entirely satisfactory, due to the fact that its entire weight and parts drag on the ground, thereby making it very unwieldy, requiring much energy to move it across the field and a collector of all weeds, straw and the like which impairs its efficiency. Also harrows that are used today are an elongated affair and as they are very difficult to be moved sidewise, the taking of them through a small opening or gateway is a very tedious and difficult task. I have overcome these objections as will be appreciated by those familiar with the art.

I will now proceed to describe one section of my harrow device, it being understood that as many of these sections as desired may be used.

I have used the numerals 10 and 11 to designate two spaced apart horizontal bars. Secured to each end of each of these bars is an upwardly curved supporting bracket 12 having a boss 13 near its free end. Threaded through each of the bosses 13 is a hollow pipe member 14 having its upper end 15 of squared construction. By the upper ends of the members 14 being squared they may easily receive a wrench to facilitate their being screwed downwardly or upwardly in the bosses 13. The numeral 16 designates a vertical shaft rotatably mounted in each of the members 14 but prevented by any suitable means from any sliding movement relative to the members 14. Rotatably secured on the lower ends of each of the shafts 16 is a wheel fork 17 carrying an ordinary earth engaging wheel 18. To facilitate the rotation of the fork 17 relative to the member 14 I have provided a washer 19 between each of the forks 17 and the members 12 and 14 to which they are secured. By this arrangement the wheels 18 are swivelly secured and may easily turn to travel in any direction. This turning moment of all of the wheels to travel in a given direction may be aided by each of the forks 17 extending downwardly at an angle to the vertical, as shown in Fig. 2 and Fig. 3. The numeral 20 designates a plurality of spaced apart parallel rods rotatably secured by U-bolts or the like to the undersides of the bars 10 and 11. These rods 20 extend transversely of the bars 10 and 11 and may be of any desired number. In the drawings I show only four for illustrative purposes. These rods 20 are all approximately the same length but the centrally located rods should have their right ends extending some distance beyond the ends of the rods to the side of them. By this construction the right ends of the rods 20 will cut a convex path, while the left ends of the rods 20 will cut a concave path, as shown in Fig. 1.

Loosely secured on the right end portions of the rods 20 is a convex end bow member 21 prevented from accidental detachment from the rods 20 by cotter-keys or the like passing through the rods 20. Loosely secured on the left end portions of the rods 20 is a concave end bow member 22 also prevented from accidental detachment by cotter-keys or the like. The numeral 23 designates a chain secured to the bow 21, the purpose of which will hereinafter be appreciated. Secured by any suitable means to each of the rods 20 are a plurality of ordinary harrow teeth 24. Rigidly secured to all of the rods 20 except the trailing rod 20 is an arm 25. The numeral 26 designates the usual hand lever rigidly secured on the trailing rod 20. The numeral 27 designates a bar pivotally secured to each of the arms 25 and the lever 26, as shown in Fig. 2. By moving the lever 26 forwardly or backwardly the angle of attack of the teeth 24 will be relatively changed. This hand lever 26 has the usual spring actuated release rod 28 engaging the usual toothed rack 29. This toothed rack 29 is secured to the usual bar 30, loosely secured to the rods 20. By this arrangement any desired position of the teeth 24, relative to their angle of attack to the earth may be rigidly obtained and maintained until it is desired to change such angle of attack.

When a plurality of sections of the device are used they may be secured one to the other by the links 31. The numeral 32 designates a beam extending across and secured to the two forward members 12. This beam 32 is designed to be secured to a tractor or horses for normally moving the invention across the ground to be conditioned. By the forward ends of the members 12 being above the wheels 18, a height of the beam is obtained which gives a direct pull from the horses or tractor, and keeps the harrow at a correct position to the ground.

This feature is distinguished from the old type harrow which had its point of pull at a very low position, which caused a tendency for the forward end portion of the harrow to be pulled upwardly away from the ground, thereby eliminating much efficiency of the harrow.

By the wheels 18 being capable of turning to any direction without disturbing the position of the harrow portion of the device, the implement may be easily turned at corners and to move the complete invention through a small gateway which is too narrow for the harrow to move through forwardly, it is merely necessary to hitch onto the chain 23 and the harrow may be easily moved sideways through the gate opening. This is a very important feature as all farm gateways are too narrow for a harrow to be moved forwardly through the same and great difficulty is always experienced in moving a harrow through such a gateway. With the present type of harrows, to make the teeth 24 bite deeper into the soil the hand lever 26 is adjusted but this means a change of angle of attack of the teeth 24, which is not always desirable. With my invention any desired angle of attack of the teeth to the soil may be had, and their penetration into the soil may be adjustably obtained by merely screwing the members 14 to the right or to the left.

By the end members 21 and 22 being of bowed construction, each section will somewhat telescope in the others, thereby leaving no spaces between the sections where the teeth 24 do not properly and successfully engage the soil.

When it is desired to transport the invention any distance when not in use, the lever 26 may be used to completely disengage the teeth 24 with the ground or supporting surface.

By the bars 10 and 11 and the rods 20 being held by the wheels 18 a certain distance above the ground there is little possibility of the invention collecting weeds, straw or the like and becoming fouled.

The device may be used on both field and highway and is especially desirable for the harrowing or cultivating of crops such as corn when the same is from three to four inches high.

Some changes may be made in the construction and arrangement of my improved earth conditioning implement without departing from the real spirit and purpose of my invention, and it is my intention to cover by my claims any modified forms of structure or use of mechanical equivalents which may be reasonably included within their scope.

I claim:

1. In a device of the class described, an elongated frame member designed to normally move in a direction transversely of its length, earth engaging teeth secured to said frame, a plurality of vertical members rotatably mounted to said frame, an earth engaging wheel rotatably mounted to each of said vertical members, and a chain at one end of said frame to facilitate the pulling of the frame in a line of travel parallel with its longitudinal axis at times and without disturbing its normal position.

2. In a device of the class described, a frame having one of its side ends cutting a convex path and its opposite side end cutting a concave path, a chain secured to one of said side ends, a means for securing a like frame to the opposite side end, a plurality of earth engaging teeth secured to said frame, a means for changing the angle of said teeth to the vertical, and caster wheels capable of supporting the weight of said frame.

3. In a device of the class described, an elongated frame member designed to normally move in a direction transversely of its length, earth engaging teeth secured to said frame, four vertical members rotatably mounted to said frame, two of which are positioned at the front end of said frame, two of which are positioned at the rear end of said frame, and all of which are positioned a considerable distance from the side ends of the said frame, an earth engaging wheel rotatably mounted to each of said vertical members, and a secured member at one side end of said frame to facilitate the pulling of the said frame in a line of travel parallel with its longitudinal axis at times and without disturbing its normal position.

IRA H. BEAL.